(12) United States Patent
Happel

(10) Patent No.: US 10,202,285 B1
(45) Date of Patent: Feb. 12, 2019

(54) DUAL SCREEN TREATMENT SYSTEM

(71) Applicant: Tom Happel, Cocoa, FL (US)

(72) Inventor: Tom Happel, Cocoa, FL (US)

(73) Assignee: Suntree Technologies Holdings, LLC, Cocoa, FL (US)

( * ) Notice: Subject to any disclaimer, the term of this patent is extended or adjusted under 35 U.S.C. 154(b) by 0 days.

(21) Appl. No.: 15/639,685

(22) Filed: Jun. 30, 2017

Related U.S. Application Data

(63) Continuation-in-part of application No. 14/288,455, filed on May 28, 2014, now abandoned.
(Continued)

(51) Int. Cl.
| | |
|---|---|
| *E03F 5/14* | (2006.01) |
| *C02F 1/00* | (2006.01) |
| *B01D 24/02* | (2006.01) |
| *B01D 21/24* | (2006.01) |
| *E03F 5/04* | (2006.01) |

(Continued)

(52) U.S. Cl.
CPC .......... *C02F 1/004* (2013.01); *B01D 21/0012* (2013.01); *B01D 21/0087* (2013.01); *B01D 21/2472* (2013.01); *B01D 24/02* (2013.01); *E03F 5/0403* (2013.01); *E03F 5/0404* (2013.01); *E03F 5/14* (2013.01); *C02F 1/00* (2013.01); *C02F 2103/001* (2013.01); *C02F 2303/24* (2013.01); *E03F 5/00* (2013.01)

(58) Field of Classification Search
CPC ......... E03F 5/0403; E03F 5/0404; E03F 5/14; B01D 21/0012; B01D 21/003; B01D 21/0087; B01D 21/2472; B01D 21/2483; B01D 24/02; B01D 35/02; C02F 2103/001

USPC .......... 210/162, 170.03, 265, 299, 304, 305, 210/311, 747.2, 747.3
See application file for complete search history.

(56) References Cited

U.S. PATENT DOCUMENTS

| | | | |
|---|---|---|---|
| 1,935,642 A | * 11/1933 | Laughlin | B01D 21/003 210/311 |
| 2,010,540 A | 8/1935 | Evans | |

(Continued)

FOREIGN PATENT DOCUMENTS

| | | |
|---|---|---|
| CA | 2455239 | 7/2005 |

OTHER PUBLICATIONS

Download from BioClean website with press release dated Dec. 7, 2017.*

(Continued)

*Primary Examiner* — Christopher Upton
(74) *Attorney, Agent, or Firm* — Brian S. Steinberger; Law Offices of Brian S. Steinberger, P.A.

(57) ABSTRACT

Vaults, boxes, systems, and methods of treatment systems to capture pollutants from storm water runoff and prevent the conveyance of these pollutants from entering a receiving water body or landscape area, which is designed to be a part of a local permanent storm water drainage infrastructure. A single treatment box, vault and system combines both drainage conveyance, multi-level treatment techniques, variable hydraulic capabilities, and easy and inexpensive methods for servicing the system. A flow spreader can split incoming water to pass into dual screen filtration systems. The system can include components selected from a shelf beneath the spreader, at least one baffle, skimmer, deflectors, media filtration and water pressure lines with spray heads for cleaning debris on a sloped floor.

20 Claims, 18 Drawing Sheets

Related U.S. Application Data

(60) Provisional application No. 61/828,958, filed on May 30, 2013, provisional application No. 62/506,188, filed on May 15, 2017.

(51) Int. Cl.
  *B01D 21/00* (2006.01)
  *E03F 5/00* (2006.01)
  *C02F 103/00* (2006.01)

(56) References Cited

U.S. PATENT DOCUMENTS

| | | |
|---|---|---|
| 4,024,881 A | 5/1977 | Weiland |
| 4,913,819 A | 4/1990 | Patterson |
| 5,114,274 A | 5/1992 | Heiler |
| 5,176,838 A | 1/1993 | Chin |
| 5,498,331 A | 3/1996 | Monteith |
| 6,125,865 A | 10/2000 | Bacon Cochrane |
| 6,270,663 B1 | 8/2001 | Happel |
| 6,379,541 B1* | 4/2002 | Nicholas ............ E03F 5/14 210/162 |
| 6,428,692 B2 | 8/2002 | Happel |
| 6,797,162 B2 | 9/2004 | Happel |
| 6,869,525 B1 | 3/2005 | Happel |
| 6,979,148 B2 | 12/2005 | Happel |
| 7,153,417 B2 | 12/2006 | Happel |
| 7,270,747 B2 | 9/2007 | Happel |
| 7,294,256 B2 | 11/2007 | Happel |
| 7,549,820 B1 | 6/2009 | Happel |
| 7,824,551 B2 | 11/2010 | Wanielista |
| 7,846,327 B2 | 12/2010 | Happel |
| 7,955,507 B2 | 6/2011 | Wanielista |
| 7,959,799 B2 | 6/2011 | Happel |
| 7,981,283 B2 | 7/2011 | Happel |
| 8,002,984 B1 | 8/2011 | Wanielista |
| 8,002,985 B1 | 8/2011 | Wanielista |
| 8,034,234 B2 | 10/2011 | Happel |
| 8,034,236 B1 | 10/2011 | Happel |
| 8,034,237 B2 | 10/2011 | Happel |
| 8,051,568 B2 | 11/2011 | Moody |
| 8,083,937 B2 | 12/2011 | Happel |
| 8,142,666 B1 | 3/2012 | Happel |
| 8,153,005 B1 | 4/2012 | Wanielista |
| 8,216,453 B2 | 7/2012 | Moody |
| 8,231,780 B2 | 7/2012 | Happel |
| 8,366,923 B1 | 2/2013 | Happel |
| 8,393,827 B1 | 3/2013 | Happel |
| 8,425,150 B1 | 4/2013 | Happel |
| 8,491,797 B1 | 7/2013 | Happel |
| 8,622,652 B1 | 1/2014 | Happel |
| 8,651,767 B1 | 2/2014 | Happel |
| 8,974,144 B1 | 3/2015 | Happel |
| 9,068,312 B1 | 6/2015 | Happel |
| 9,340,965 B2 | 5/2016 | Happel |
| 9,534,368 B1 | 1/2017 | Happel |
| 2004/0222170 A1 | 11/2004 | Hauge |
| 2006/0086676 A1 | 4/2006 | Smith |
| 2008/0006304 A1 | 1/2008 | Treherne |
| 2012/0073675 A1 | 3/2012 | Dupuis |
| 2014/0102479 A1 | 4/2014 | Steffen |
| 2014/0352729 A1* | 12/2014 | Happel ............ E03F 5/108 405/36 |
| 2015/0114893 A1* | 4/2015 | Moll ............ E03F 5/0404 210/170.03 |
| 2015/0129473 A1* | 5/2015 | Kent ............ E03F 5/14 210/170.03 |
| 2015/0183659 A1* | 7/2015 | Kent ............ E03F 5/14 210/170.03 |
| 2015/0258472 A1* | 9/2015 | Kent ............ B01D 21/0012 210/323.1 |
| 2017/0342698 A1* | 11/2017 | Fink ............ E03F 5/14 |

OTHER PUBLICATIONS

Spantek, Expanded Metal, Expanded Metal Patterns, no date available, 4 pages.

Bioclean, Debris Separating Baffle Box, Dual Stage Hydrodynamic Separator, no date available, 2 pages.

* cited by examiner

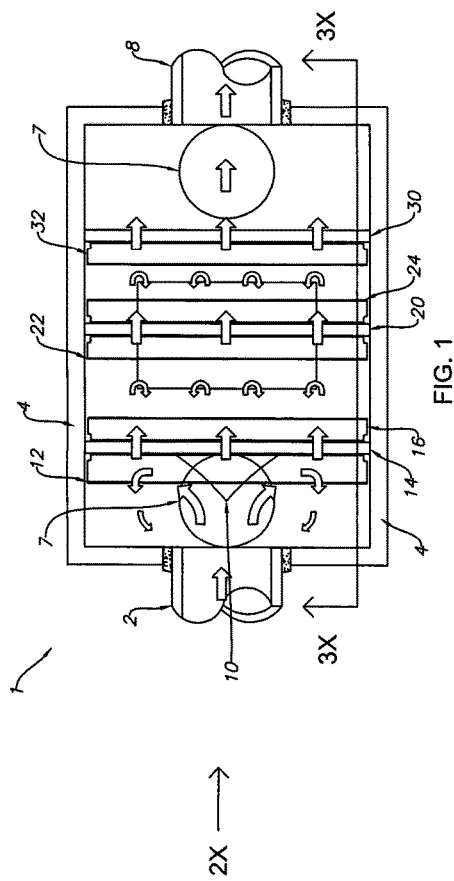
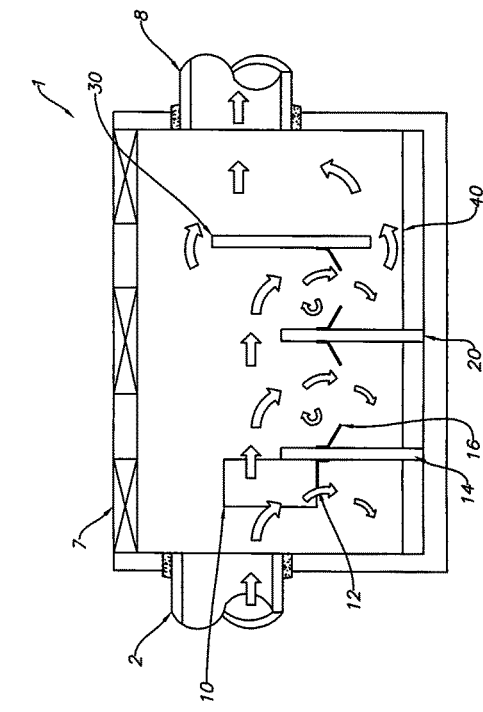
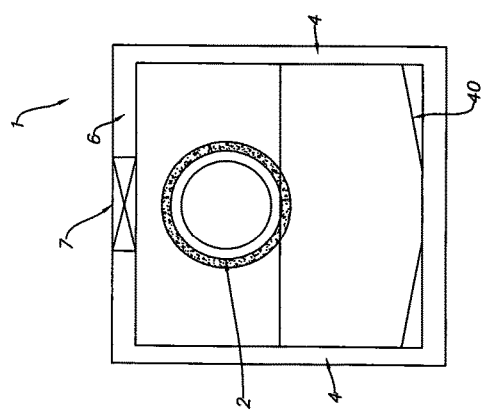

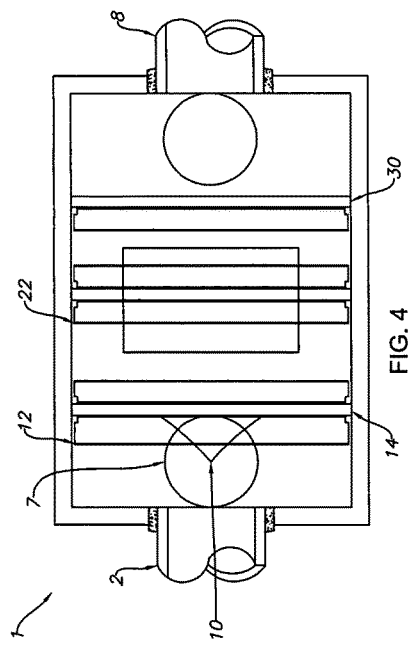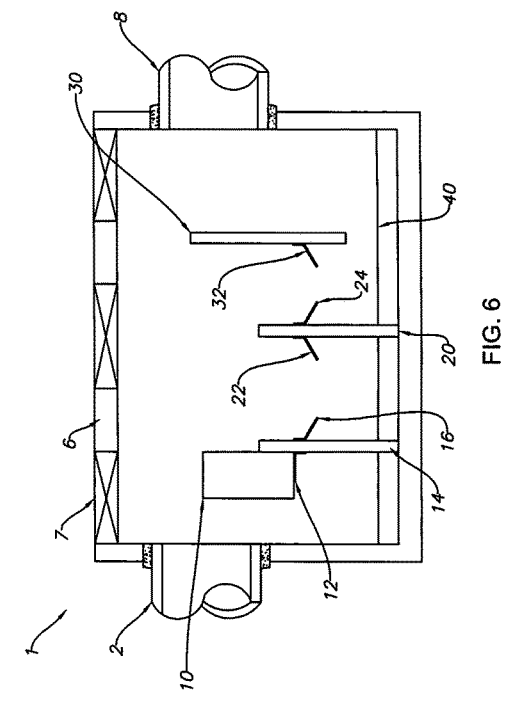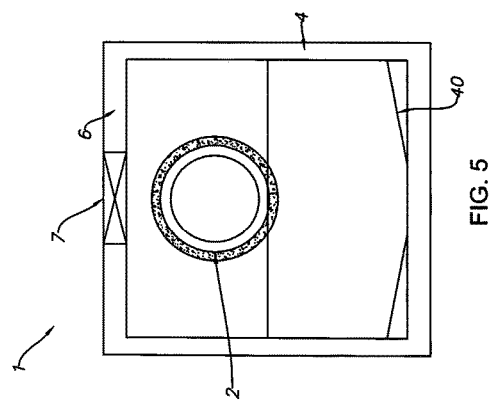

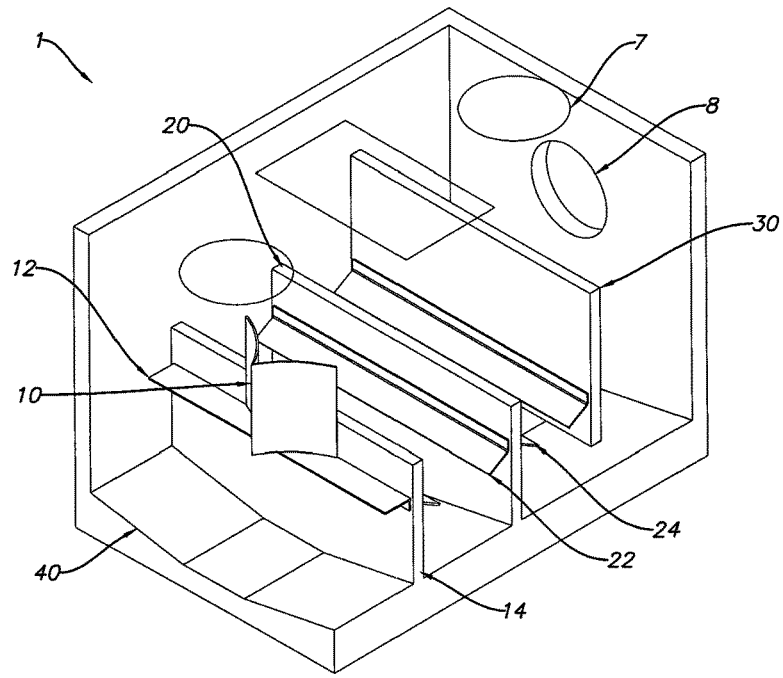

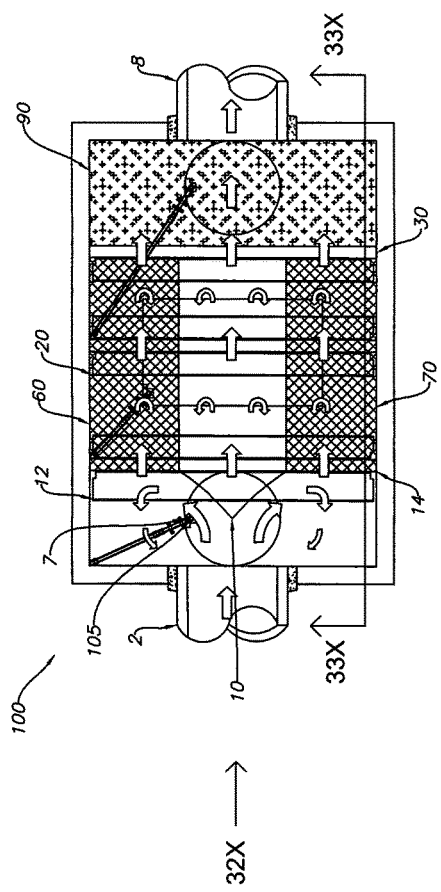
FIG. 31
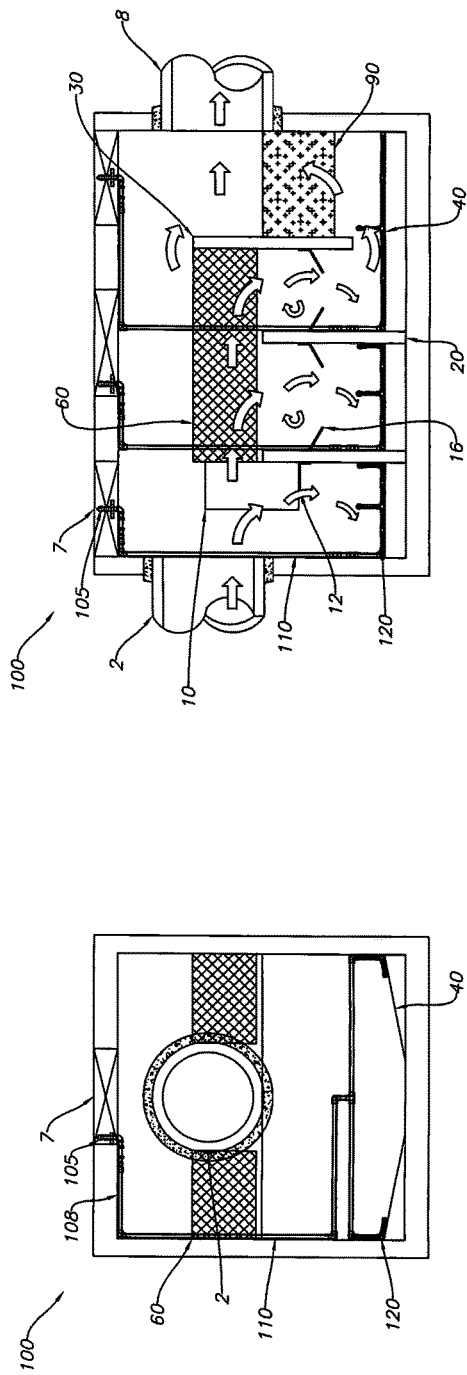
FIG. 33
FIG. 32

DUAL SCREEN TREATMENT SYSTEM

CROSS REFERENCE TO RELATED APPLICATIONS

This application is a Continuation-In-Part of U.S. patent application Ser. No. 14/288,455 filed May 28, 2014, now abandoned, which claims the benefit of priority to U.S. Provisional Patent Application Ser. No. 61/828,958 filed May 30, 2013. The entire disclosure of each of the applications listed in this paragraph are incorporated herein by specific reference thereto.

FIELD OF INVENTION

This invention relates to water detention and treatment, and in particular to vaults, boxes, systems, and methods of treatment systems to capture pollutants from storm water runoff and prevent the conveyance of these pollutants from entering a receiving water body or landscape area, which is designed to be a part of a local permanent storm water drainage infrastructure, where a single treatment system combines both drainage conveyance, multi-level treatment techniques, variable hydraulic capabilities, and easy and inexpensive methods for servicing the system.

BACKGROUND AND PRIOR ART

Since the passage of the Clean Water Act in 1972 the federal government through the Environmental Protection Agency (EPA) has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as storm water management.

Devices, systems and procedures that remove or reduce the pollutants and contaminates and/or control peak flows and volumes are often referred to as best management practices (BMPs). The BMPs can utilize natural, artificial or man-made techniques, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands.

BMPs typically use one or more mechanisms to remove the pollutants and contaminates. These mechanisms include sedimentation, filtration, absorption, adsorption, flocculation, stripping, leaching, bioremediation, and chemical processes including oxidation reduction, ion exchange, and precipitation.

Furthermore, storm water treatment systems can also be classified in relationship to the treatment level in which they are being used. In this respect, the term treatment is generally used to describe the unit processes that are used to reduce the quantities of pollutants and containments in storm water runoff.

For example, basic or pre-treatment typically refers to the removal of gross solids, sediments and larger debris through the processes of settling and screening. Enhanced or advanced treatment typically refers to processes or reducing targeted pollutants.

Filtration is a common form of enhanced treatment for storm water. Filtration utilizes a combination of physical, chemical, and biological processes. Types of filtration greatly vary dependent on the media use. Medias can be both inert and/or sorbent and are also strongly linked to natural biological processes that thrive in and/or around the media environment. Advanced filtration techniques especially include chemical and biological processes and generally include, but are not limited to processes that bring storm water in contact with plants including both macrophytes and microphytes. And the plants are both visible and invisible to the naked eye.

The reduction of nutrients that are conveyed via storm water runoff are in the forefront of the various pollutants of concern. For example; the EPA (Environmental Protection Agency) has mandated that the state of Florida reduce the overall pollutant discharge of the state by approximately ⅓. To this end the EPA has established a numeric nutrient criteria for all water bodies of the state for total phosphorus (TP) and total nitrogen (TN). These nutrient numeric values cannot be exceeded within these water bodies of the state. The result of exceeding these numeric values will result with the state of Florida being fined by the EPA.

Common pollutants typically found in storm water flow can include sediment, foliage, litter, nutrients, metals, hydrocarbons, and bacteria. Because pollutants vary significantly in their respective physical characteristics, a variety of techniques are applied to better address difficulties with capturing the pollutants. For example; capturing hydrocarbons, which are typically in a liquid state, require a different technique than capturing litter which are in a solid state.

Storm water treatment systems that make use of filtration media can vary significantly just by making use of different types of filtration media. Understanding that effectiveness will vary for different types of filtration media, has filtration media functions by combining the processes of physical filtration, sorbent or reactive surfaces, and biological activity.

Physical filtration will physically prevent the conveyance of solids, sorbent or reactive surfaces will chemically bond to the pollutants, and the biological activity will consume pollutants. Physical filtration whether by use of a filtration media or a screen can be an effective technique for capturing solids. Contained within and attached to the solids are a wide spectrum of pollutants of concern that can range from nutrients, to litter, to bacteria. A difficulty with physical filtration is that the collected solids can become so numerous that the rate of filtration is slowed to an ineffective flow rate. Servicing of the filtration media is typically required, and the servicing often requires the media to be replaced as a part of servicing.

Filtration media will have sorbent or reactive surfaces that vary in effectiveness depending on the type of media. For storm water treatment applications, the media is granular in shape. However, the reactivity of the media surfaces is limited by the number of receptors on the surface of the media.

Making use of media that has a lot of surface area will increase the number of available receptors. A common method to increasing the surface area of the media is using media that is small in granular size. However, the smaller the granular size of the media the more likely the media will be to bind due to the collection of solids within the media. In addition, the receptors can be binded by solids which prevent the water flow from reaching the surface of the media granules.

Because there is not a single storm water treatment technique that is the best for removing all pollutants of concern, a treatment system that combines multiple techniques in a treatment train arrangement will likely yield a wide spectrum of storm water treatment success. In addition, there is an economic consideration for applying storm water treatment. For example; the costs and frequency for servicing a storm water treatment system will be an indicator as to the sustainability of the system, and all storm water treatment systems require servicing.

Thus, the need exists for solutions to the above problems with the prior art.

SUMMARY OF THE INVENTION

An objective of the present invention is to provide vaults, boxes, systems, and methods of using treatment systems to capture pollutants from storm water runoff and prevent the conveyance of these pollutants from entering a receiving water body or landscape area, which is designed to be a part of a local permanent storm water drainage infrastructure, where the system combines both drainage conveyance, multi-level treatment techniques, variable hydraulic capabilities, and easy and inexpensive methods for servicing the invention.

Storm water pollution prevention system that prevents the conveyance of a wide spectrum of pollutants from being conveyed to a receiving body of water or landscape area, and incorporates multiple stages and processes for the treatment of water that is shed from an area as a result of rain.

The system can incorporate hydro-dynamic separation, screen filtration with or without media filtration all in a single treatment system. This treatment system is divided into distinct zones by baffles that span the width of the vault. These baffles will help to isolate solids that settle in the lower settling chambers from turbulent water flow. In addition, the use of a skimmer baffle will help to prevent the conveyance of floatables. For additional treatment, filtration media can be added between the skimmer baffle and the outflow pipe.

Because the cross-sectional conveyance through the treatment system is much greater than that of the inflow pipe, as water enters into the vault the linear velocity of the water flow is reduced. In addition, the inflowing water hits onto a flow spreader located not far from the inflow pipe. This flow spreader will influence the spreading of the flow wide while creating a vortex to the left and right of the inflowing water. The vortex created to the left and right of the flow spreader will influence solids to settle into the lower settling chambers. A deflector located along the underside of the flow spreader will aid with preventing the turbulent water entering the treatment system from scouring previously captured sediments. Essentially, a calm zone is created below the horizontal deflector. This zone can enable fine particles to settle while preventing previously captured fine particles from being re-suspended out of this settling zone.

After the storm water flow has been spread wide by the flow spreader, the flow will enter into the body of a screen system (dual screen systems) located on each side of the vault. The primary purpose of the dual screen systems is to capture floating debris such as litter and foliage. As water flow and floating debris enters into the dual screen systems, water can pass through the screens and the floating debris can be retained within the screens.

The dual screens can be positioned within the vault so that the bottom of the screen systems can be above the invert elevation of the outflow pipe. After the rain event has ended the hydraulic gradeline within the vault will lower to an elevation equal to that of the outflow pipe invert. Because the captured debris in the screen systems is higher in elevation than that of the water level retained in the vault, the captured debris will be stored in a dry state between rain events. Storing the captured debris in a dry state between rain events can prevent the pollutants contained in the floating debris from diffusing into the water over time.

Once the water flow exits the dual screen systems a skimmer located between the screen systems and the outflow pipe can act to prevent floatables from being conveyed downstream.

For additional treatment, filtration media can be placed between the skimmer and the outflow pipe. The filtration media can be contained within vessels or a screen system so that the water flow cannot dislodge the media and wash it down stream. Water flow can be diverted downward by the skimmer, and then the water flow will upflow through the media. As the water passes through the media sorbent surfaces, physical filtration, and biological activity can act to capture pollutants.

In the event that a large rain event occurs and the water level within the treatment system rises in elevation above the screen systems and skimmer, water flow can convey above all the specialized components of the treatment system. The cross-sectional conveyance through the vault, and above the screen systems and skimmer, far exceeds that of the inflow and outflow pipes. Because the potential water conveyance above all the specialized components of the treatment system is so great, then potential upstream flooding is avoided.

Eventually, the treatment system requires servicing. The high pressure water servicing system can dramatically reduce the required time to remove the captured debris in the lower chambers. The servicing system has high water pressure jets that will flush captured debris toward the center of the settling chambers. These jets will liquefy the captured debris from underneath, turn the captured debris into a slurry, and then flush the debris slurry toward the center of the settling chambers so that a vacuum truck can easily remove the slurry.

The use of this high pressure servicing system avoids the need for a service technician to enter the vault to perform servicing. The regulations set by OSHA for personnel to enter a confined space, such as a storm water treatment system for servicing, are complicated, time consuming, and costly.

The Problems Solved by this Invention are as Follows

1) Sediments, other solids, and their associated pollutants, are captured and retained by the treatment system and prevented from being conveyed to a receiving downstream water body.
2) Floatables like litter, foliage, and their associated pollutants, are captured by the dual screen systems and retained by the treatment system and prevented from being conveyed to a receiving downstream water body. Because the solids captured by the dual screen system are stored at an elevation above the static water level, their associated pollutants are not diffused into the water below.
3) The skimmer will help to prevent floatables that get past the screen systems from being conveyed out of the treatment system.
4) Dissolved pollutants can be captured by the filtration are retained within the treatment system and prevented from being conveyed to a receiving downstream water body.

5) Servicing the treatment system can dramatically made easier by the high water pressure servicing system. Serving the lower settling chambers can be accomplished in a fraction of the time required by other treatment system, you get all the debris out, and a technician does not have to go inside the vault. Having a technician enter a vault treatment system for servicing is problematic because of OSHA (Occupational Safety and Health Administration) confined space rules. With the invention, nobody has to enter the vault which keeps people safe and save time and money.

Further objects and advantages of this invention will be apparent from the following detailed description of the presently preferred embodiments which are illustrated schematically in the accompanying drawings.

BRIEF DESCRIPTION OF THE FIGURES

First Embodiment Dual Vortex Baffle Box/Vault/System

FIG. 1 is a top view of a dual vortex baffle box with sloped floors, flow spreader, shelf and baffle deflectors and arrows showing water flow.

FIG. 2 shows an inflow end view of the dual vortex baffle box of FIG. 1 along arrow 2X.

FIG. 3 is a side cross-sectional view of the dual vortex baffle box of FIG. 1 along arrows 3X.

FIG. 4 is another top view of the dual vortex baffle box of FIG. 1 without arrows.

FIG. 5 is another inflow end view of the dual vortex baffle box of FIG. 2.

FIG. 6 is another side cross-sectional view of the dual vortex baffle box of FIG. 3.

FIG. 7 is an upper front right perspective view of the dual vortex baffle box of FIG. 1.

FIG. 8 is an upper rear left perspective view of the dual vortex baffle box of FIG. 1.

Second Embodiment Dual Baffle Box/Vault with Screened Systems and Hinging Lids

Figure 11:
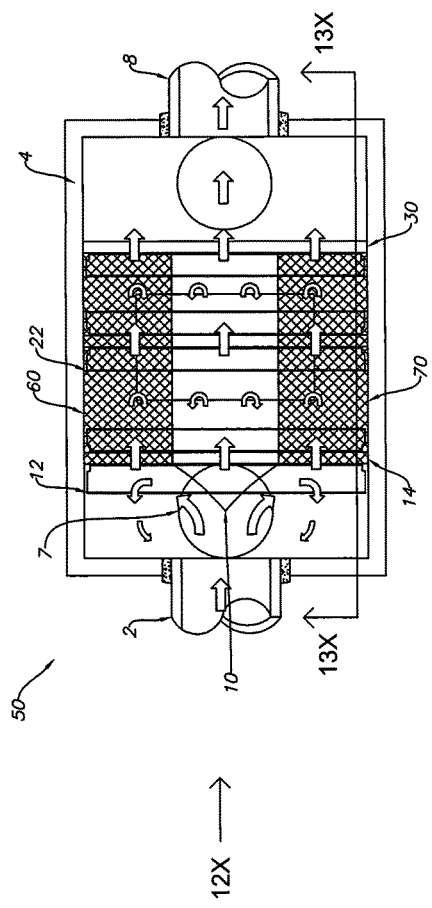

FIG. 11 is a top view of the dual screen baffle box with hinging lids and arrows showing water flow.

Figure 12:
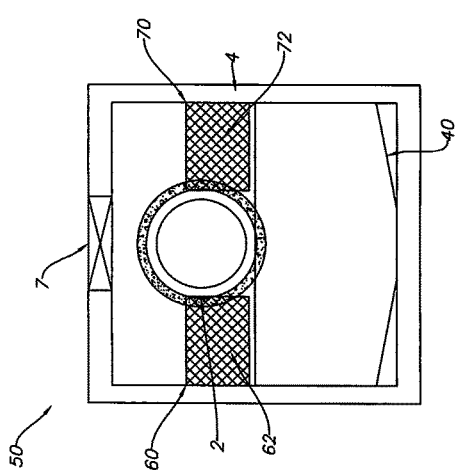

FIG. 12 is an inflow end view of the dual screen baffle box of FIG. 11 along arrow 12X.

Figure 13:
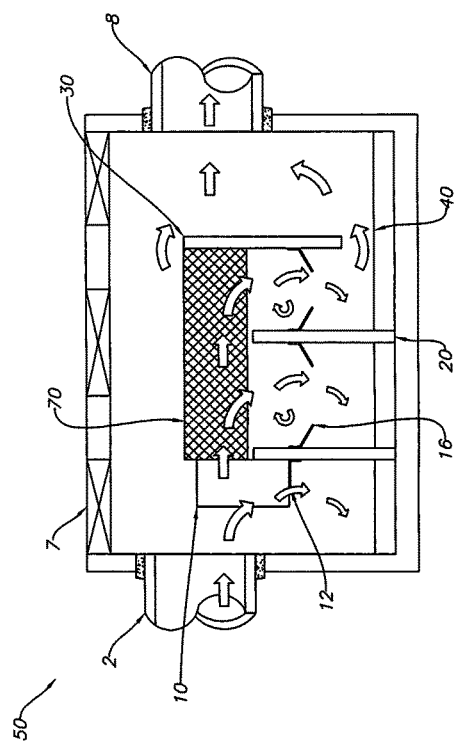

FIG. 13 is a side cross sectional view of the dual screen baffle box of FIG. 11 along arrows 13X.

Figure 14:
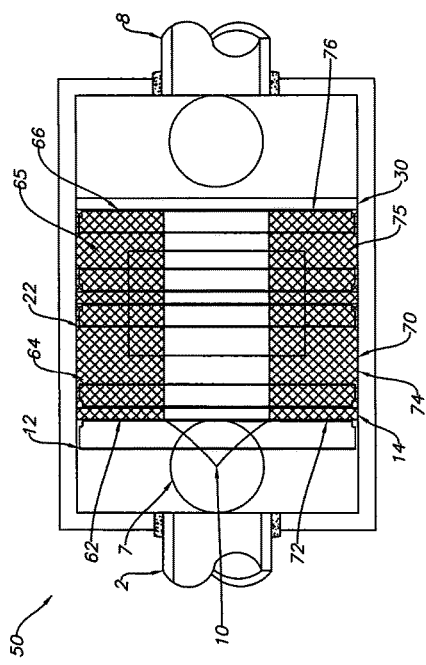

FIG. 14 is another top view of the dual screen baffle box of FIG. 11 without arrows.

Figure 15:
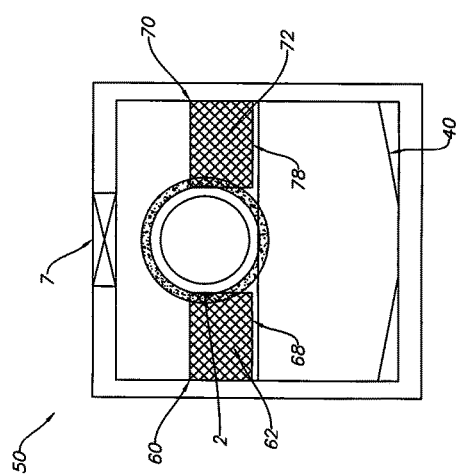

FIG. 15 is another inflow end view of the dual screen baffle box of FIG. 12.

Figure 16:
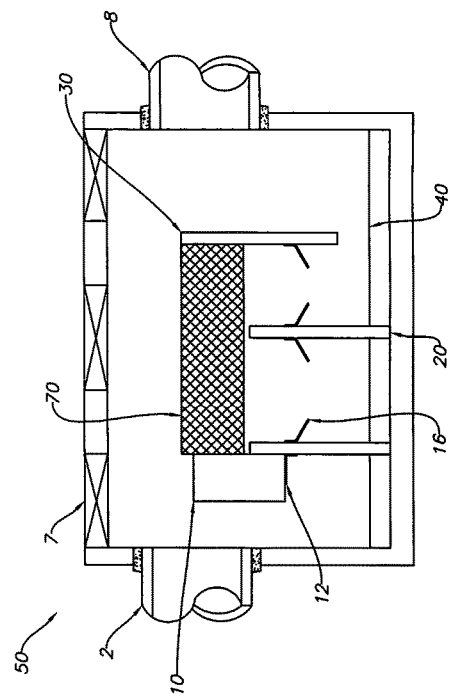

FIG. 16 is another side cross-sectional view of the dual screen baffle box of FIG. 13.

Figure 17:
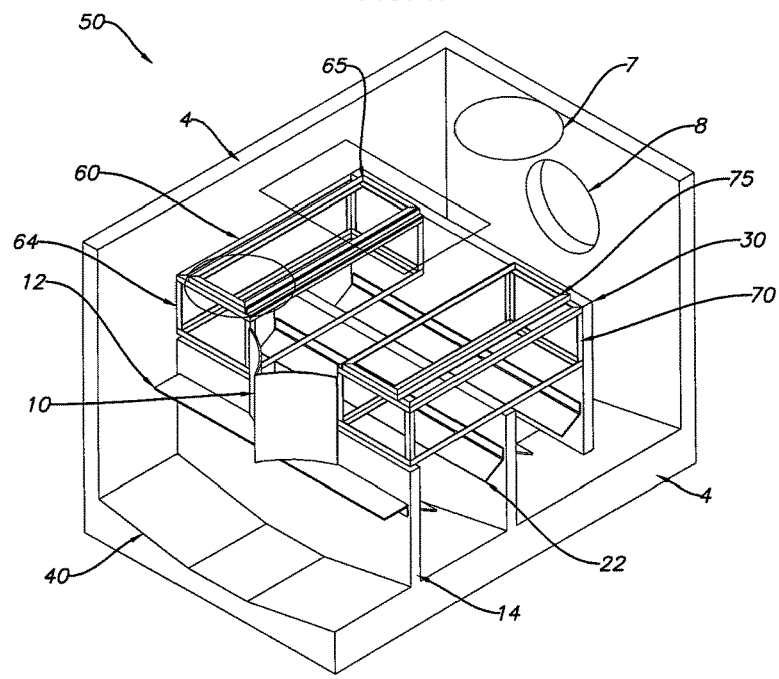

FIG. 17 is an upper front right perspective view of the baffle box of FIG. 11.

Figure 18:
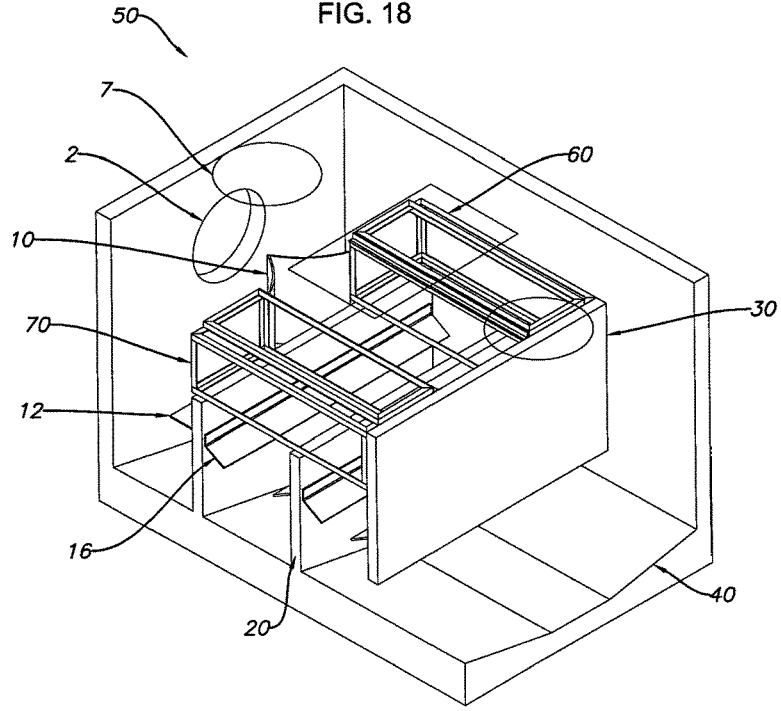

FIG. 18 is an upper rear left perspective view of the baffle box of FIG. 11.

Figure 19:
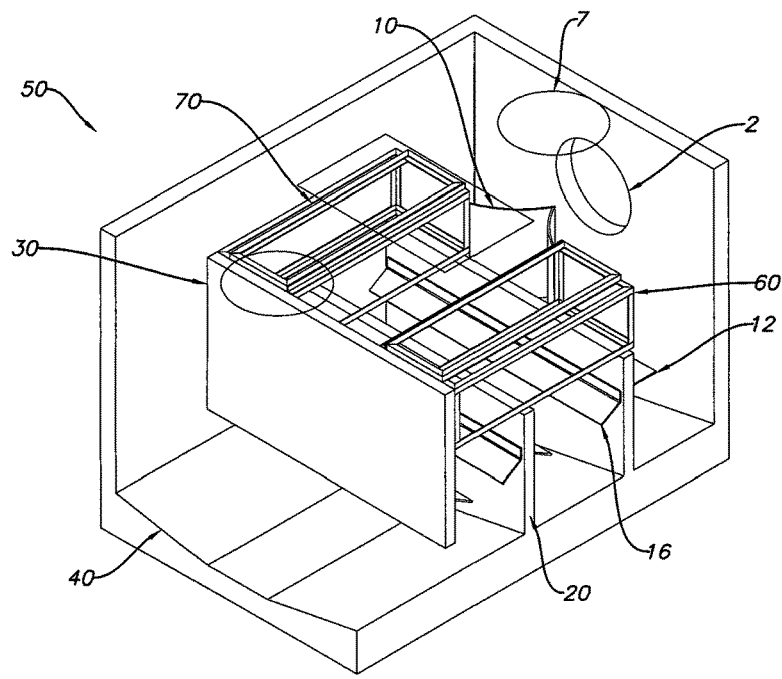

FIG. 19 is an upper rear right perspective view of the baffle box of FIG. 11.

Figure 20:
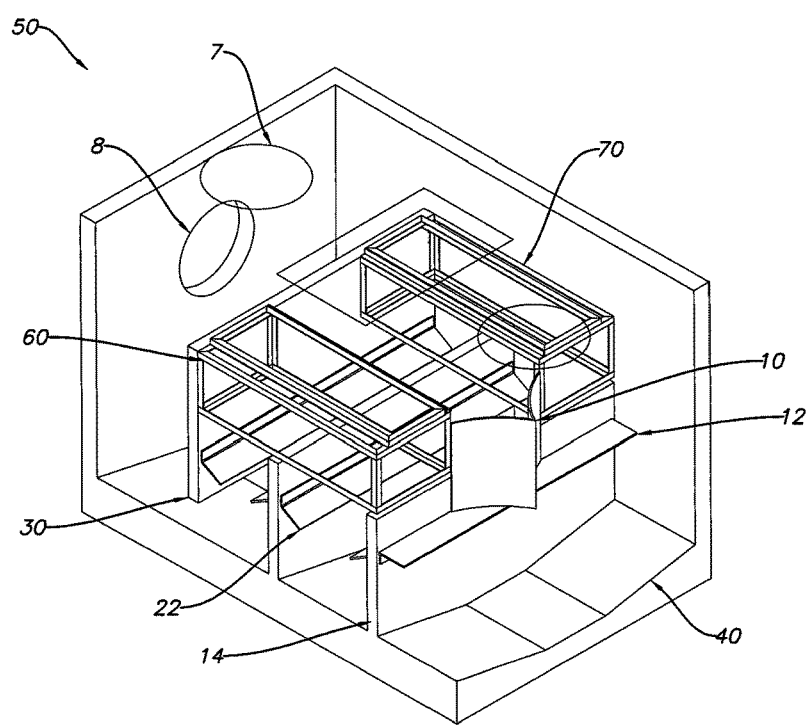

FIG. 20 is an upper front left perspective view of the baffle box of FIG. 11.

Third Embodiment Dual Baffle Box with Screened Media Vessel

Figure 21:
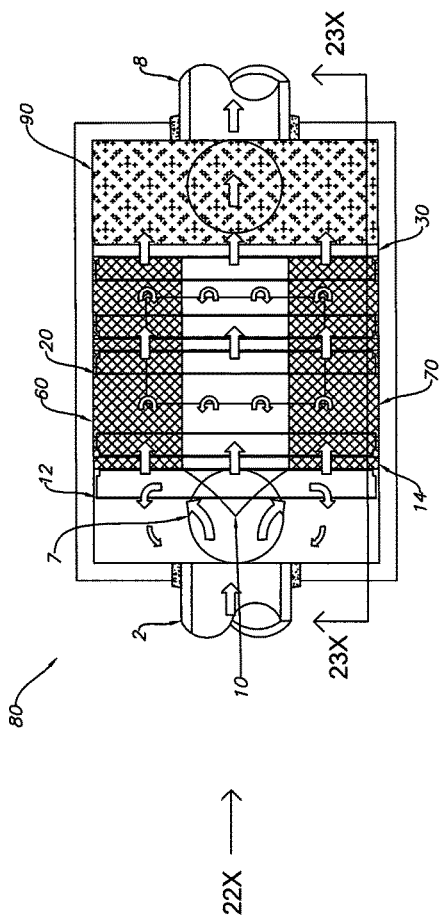

FIG. 21 is a top view of the dual screen baffle box with screened media vessel and arrows showing water flow.

Figure 22:
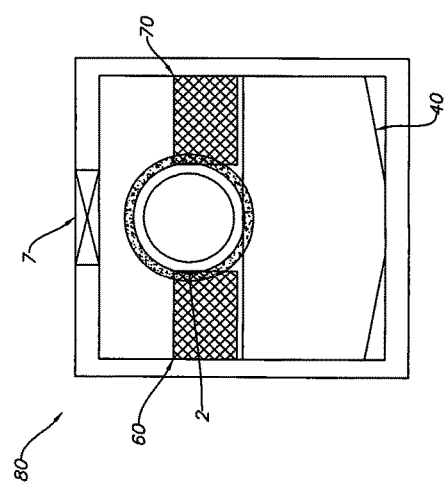

FIG. 22 is an inflow end view of the dual screen baffle box of FIG. 21 along arrow 22X.

Figure 23:
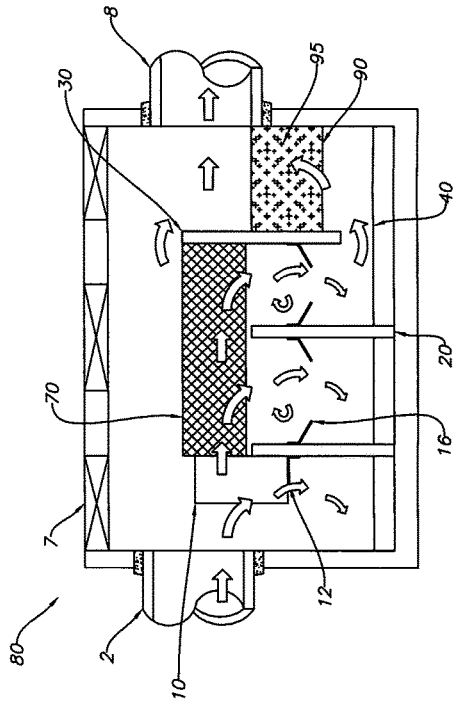

FIG. 23 is a side cross sectional view of the dual screen baffle box of FIG. 21 along arrows 23X.

Figure 24:
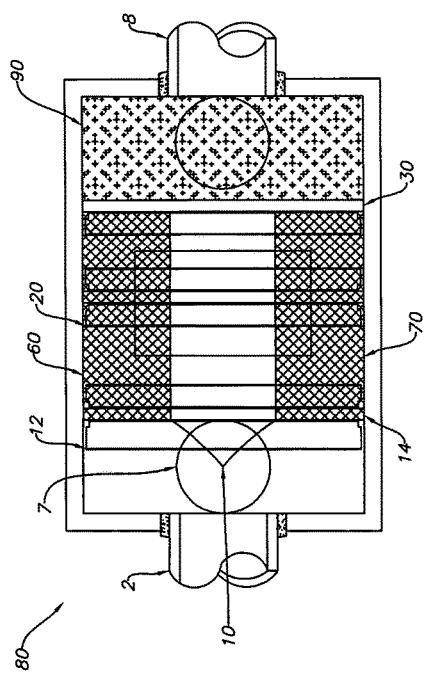

FIG. 24 is another top view of the dual screen baffle box of FIG. 21 without arrows.

Figure 25:
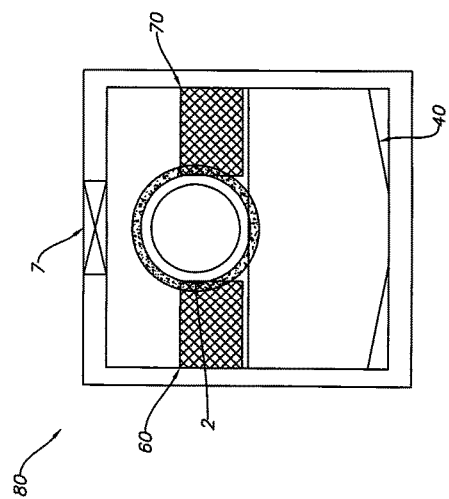

FIG. 25 is another inflow end view of the dual screen baffle box of FIG. 22.

Figure 26:
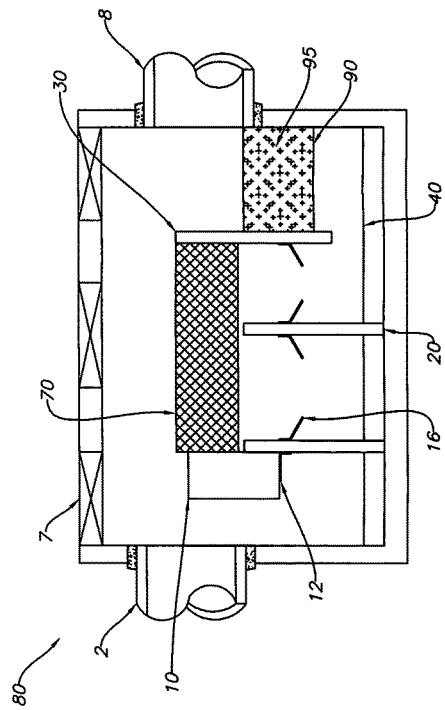

FIG. 26 is another side cross-sectional view of the dual screen baffle box of FIG. 23.

Figure 27:
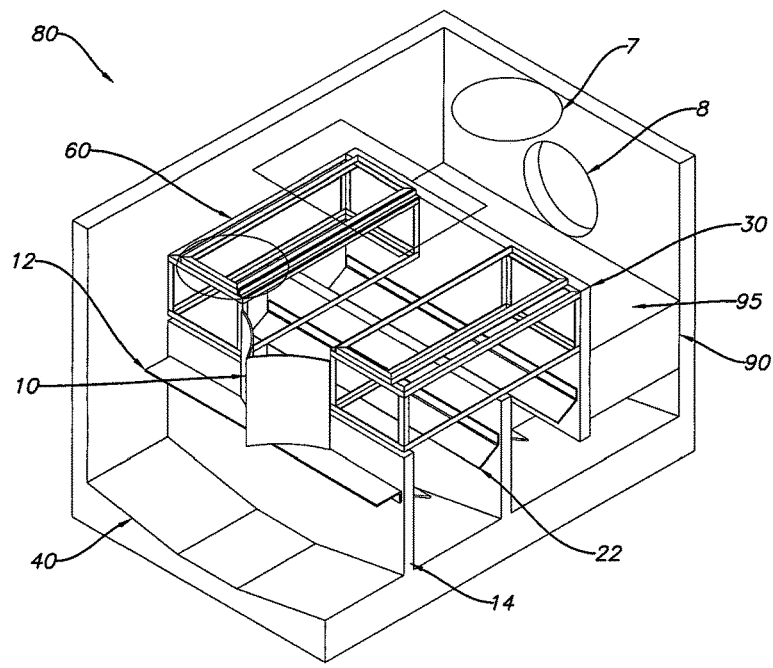

FIG. 27 is an upper front right perspective view of the baffle box of FIG. 21.

Figure 28:
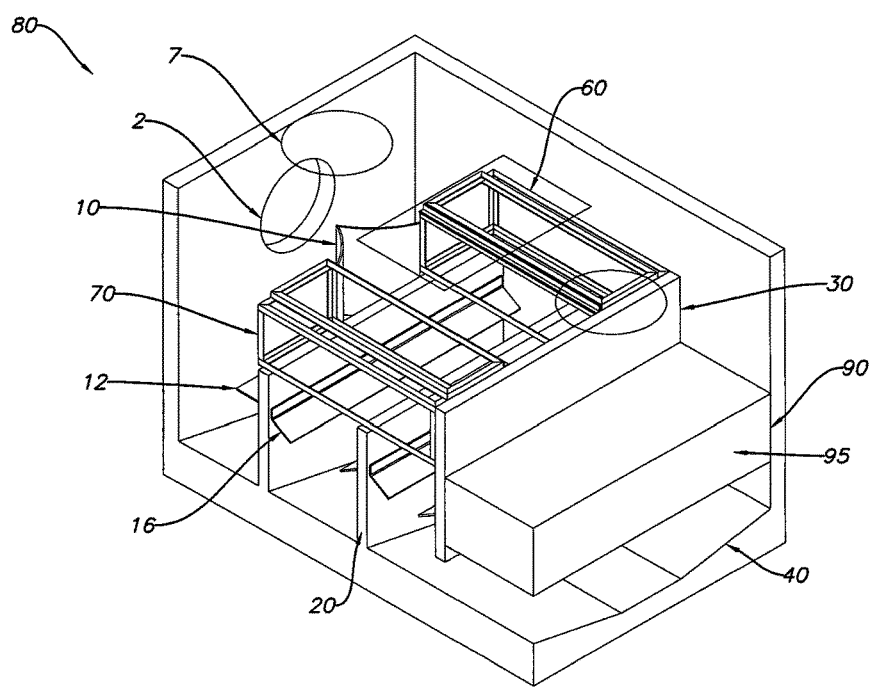

FIG. 28 is an upper rear left perspective view of the baffle box of FIG. 21.

Figure 29:
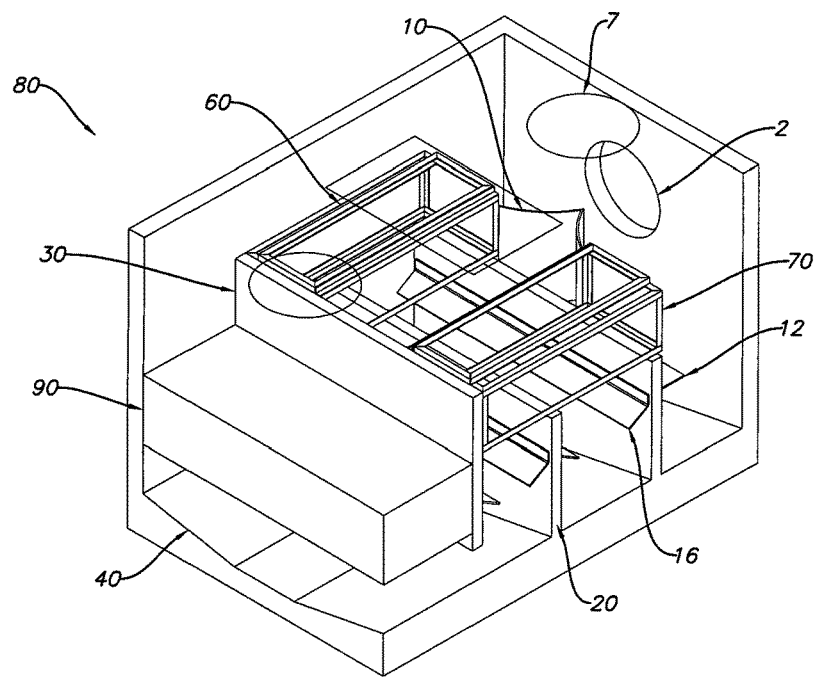

FIG. 29 is an upper rear right perspective view of the baffle box of FIG. 21.

Figure 30:
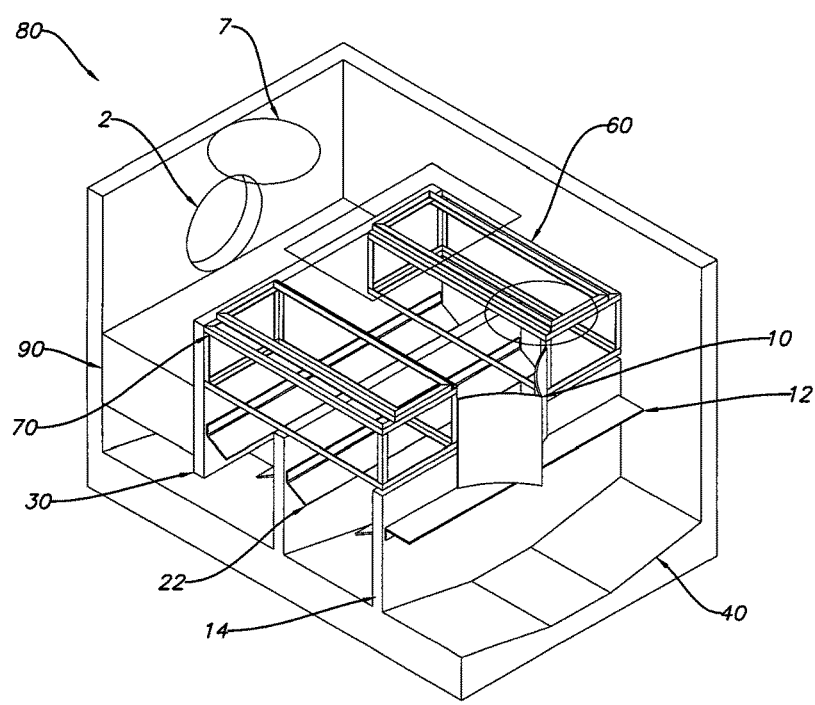

FIG. 30 is an upper front left perspective view of the baffle box of FIG. 21.

Fourth Embodiment Dual Baffle Box with Hydroslide Servicing System

FIG. 31 is a top view of the dual screen baffle box with hydroslide servicing system and arrows showing water flow.

FIG. 32 is an inflow end view of the dual screen baffle box of FIG. 31 along arrow 32X.

FIG. 33 is a side cross sectional view of the dual screen baffle box of FIG. 31 along arrows 33X.

Figure 34:
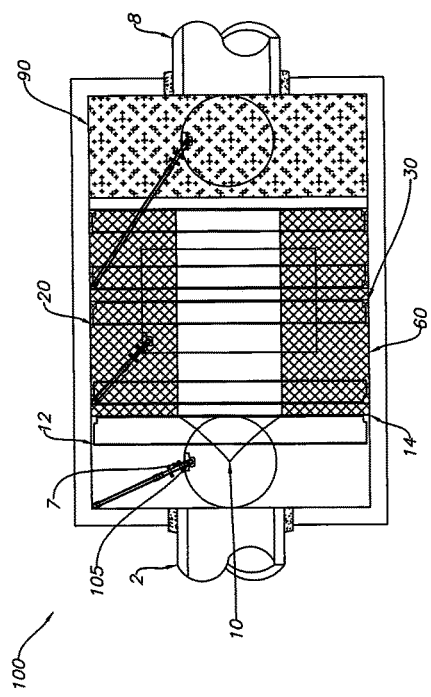

FIG. 34 is another top view of the dual screen baffle box of FIG. 31 without arrows.

Figure 35:
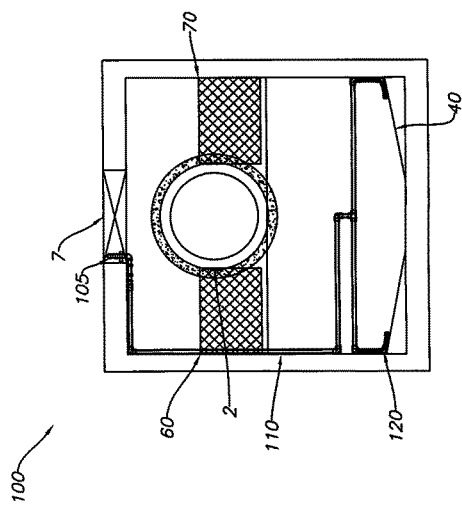

FIG. 35 is another inflow end view of the dual screen baffle box of FIG. 22.

Figure 36:
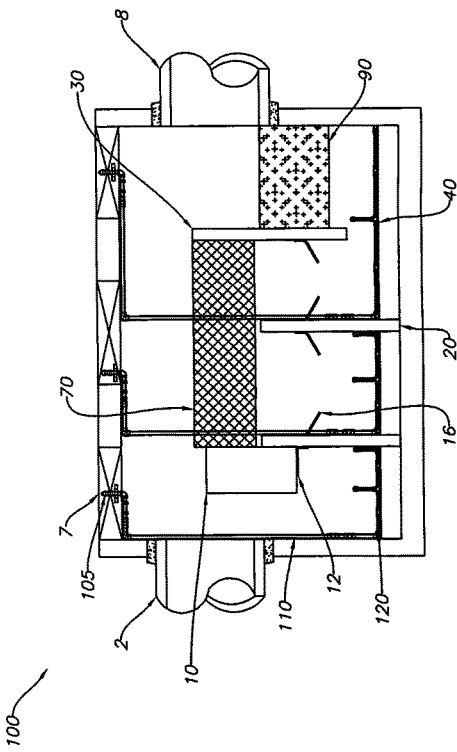

FIG. 36 is another side cross-sectional view of the dual screen baffle box of FIG. 33.

Figure 37:
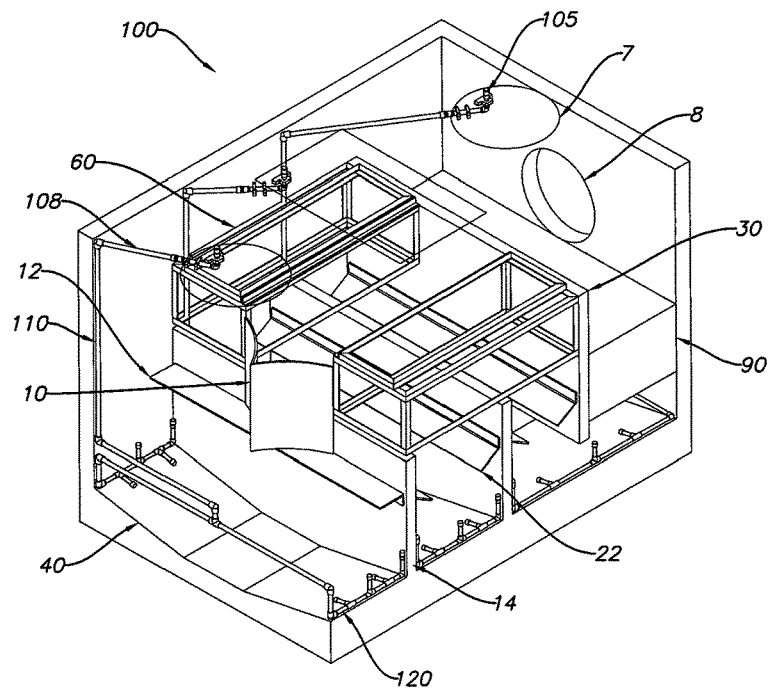

FIG. 37 is an upper front right perspective view of the baffle box of FIG. 31.

Figure 38:
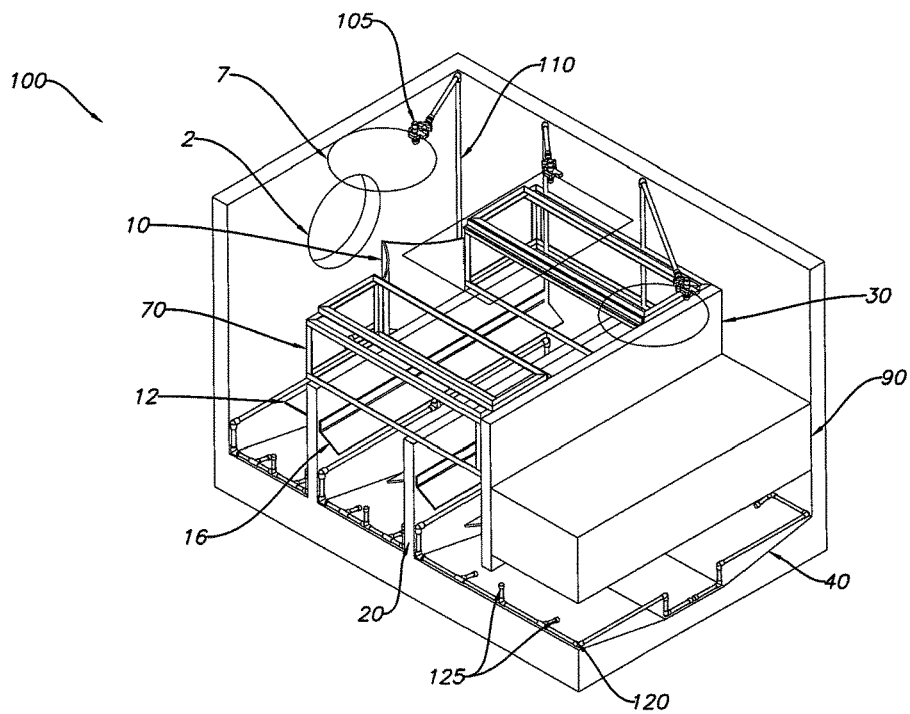

FIG. 38 is an upper rear left perspective view of the baffle box of FIG. 31.

Figure 39:
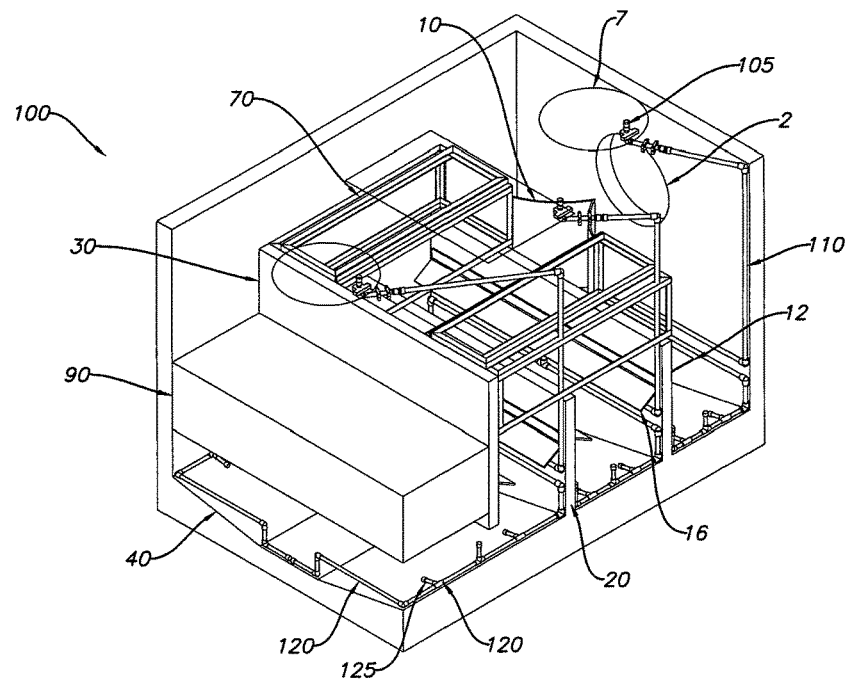

FIG. 39 is an upper rear right perspective view of the baffle box of FIG. 31.

Figure 40:
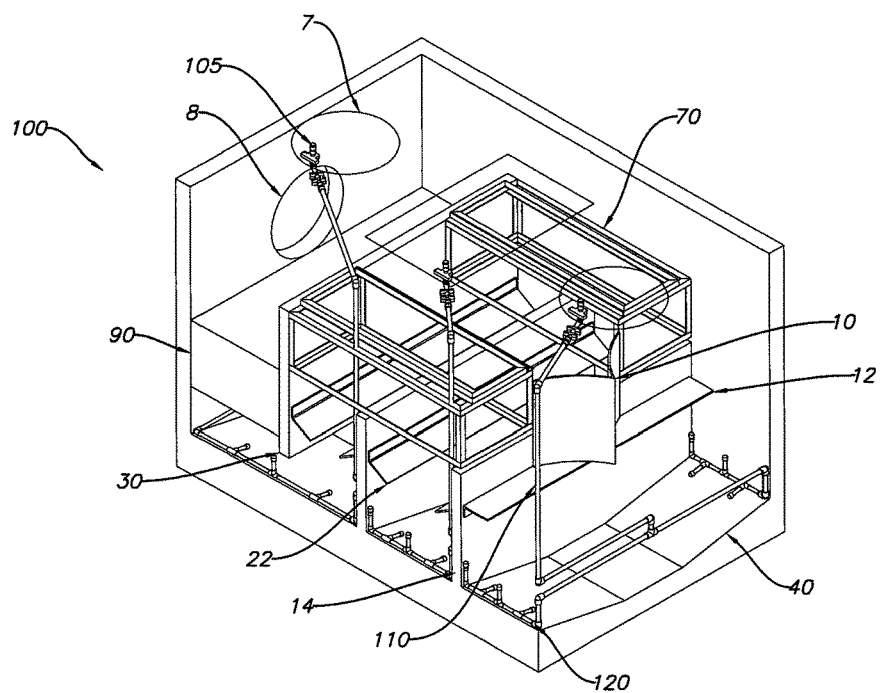

FIG. 40 is an upper front left perspective view of the baffle box of FIG. 11.

Figure 41:
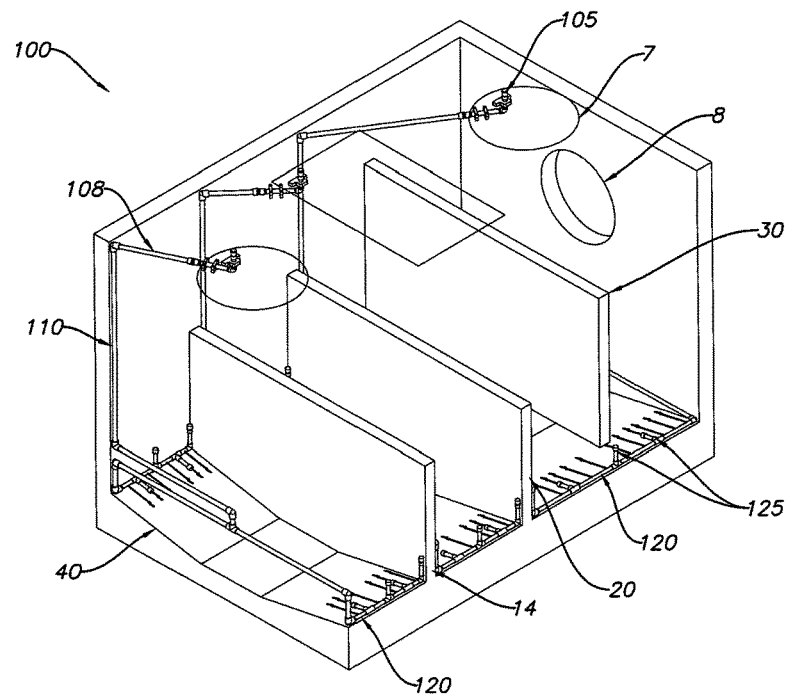

FIG. 41 is an upper front right perspective view of the baffle box of FIG. 37 with screened media vessel, flow spreader and screens with hinge lids all removed.

Figure 42:
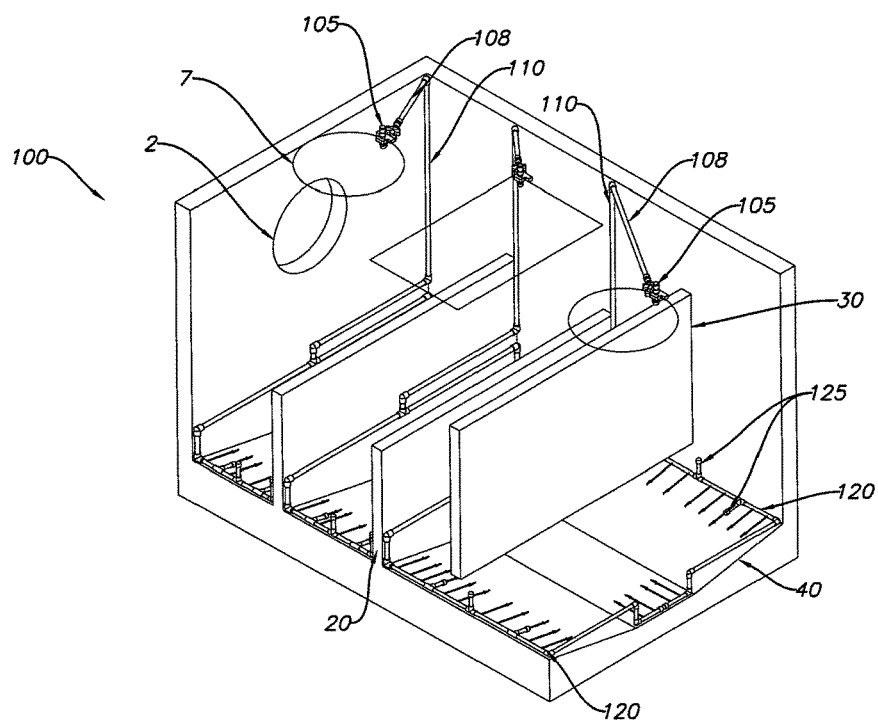

FIG. 42 is an upper rear left perspective view of the baffle box of FIG. 38 with screened media vessel, flow spreader and screens with hinge lids all removed.

Figure 43:
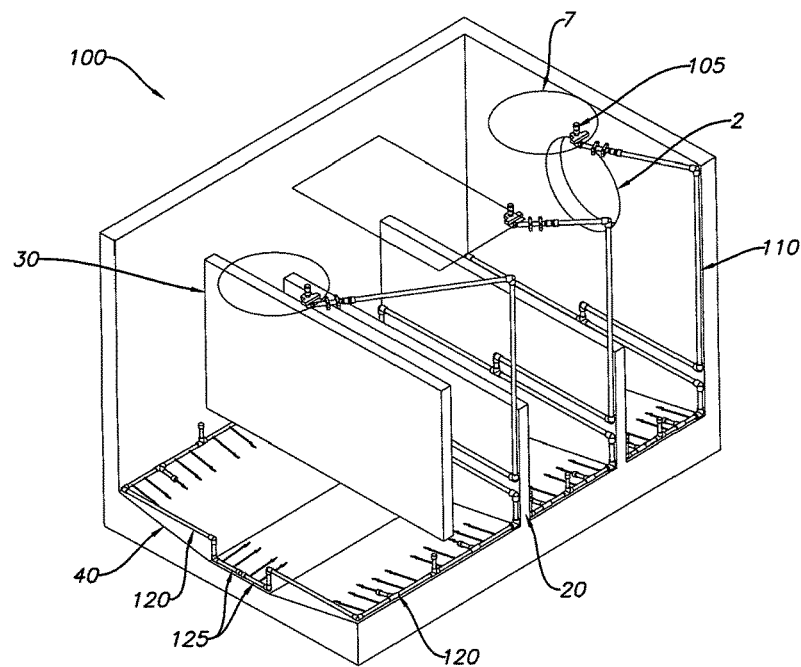

FIG. 43 is an upper rear right perspective view of the baffle box of FIG. 39 with screened media vessel, flow spreader and screens with hinge lids all removed.

Figure 44:
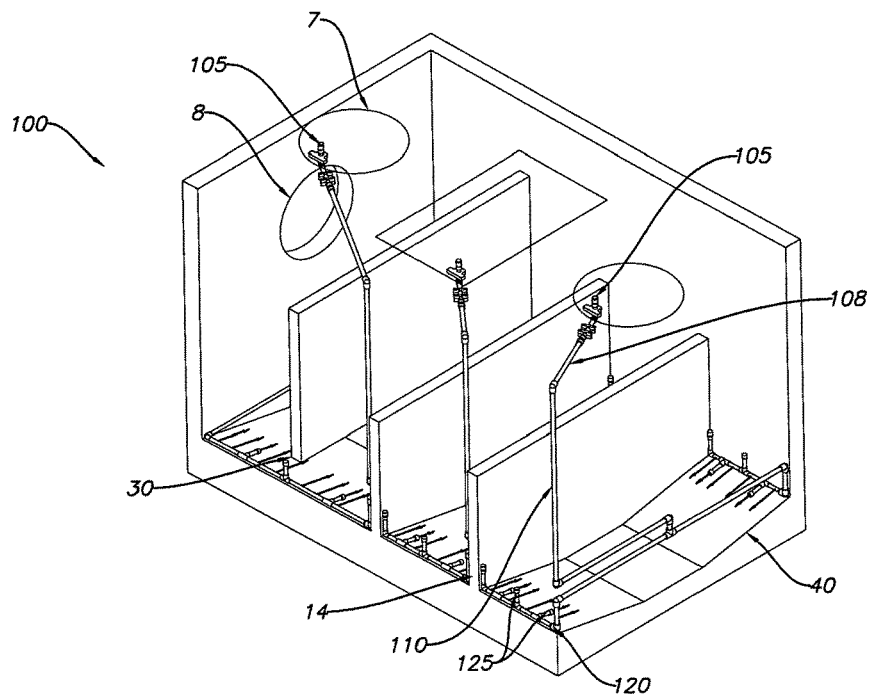

FIG. 44 is an upper front left perspective view of the baffle box of FIG. 40 with screened media vessel, flow spreader and screens with hinge lids all removed.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
1 dual vortex baffle vault/box/system
2 inflow pipe/line
4 side walls of vault/box
6 top of vault/box
7 access point
8 outflow pipe/line
10 flow spreader V shape with concave sides
12 shelf/deflector
14 first baffle
16 baffle deflector on outlet side of first baffle
20 second baffle
22 first deflector on second baffle on inlet side
24 second deflector on second baffle on outlet side
30 skimmer baffle
32 first deflector on skimmer baffle on inlet side
40 sloped floor
50 dual vortex baffle box/vault/system with screen systems and hinging lids
60 first (left side) hinged screen box
62 screen front wall
64 screen sides
65 hinged screen lid
66 screen rear wall
68 screen floor
70 second (right side) hinged screen box
72 screen front wall
74 screen sides
75 hinged screen lid
76 screen rear wall
78 screen floor
80 dual vortex baffle box/vault/system with screen systems, hinged lids and media vessel
90 media vessel
95 media
100 dual vortex baffle box/vault/system with screen systems, hinged lids and media vessel and hydroslide servicing system
105 water connection(s)
108 upper horizontal water line(s)
110 vertical water line(s)
120 spray bar(s) along side floor corners
125 spray head(s)

First Embodiment Dual Vortex Baffle Box/Vault/System

Figure 9:
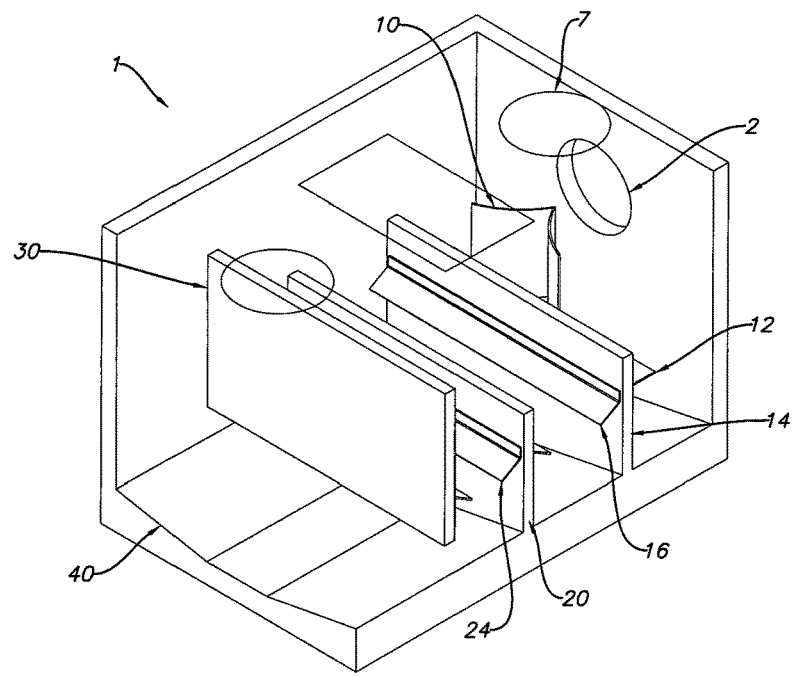
FIG. 9 is an upper rear right perspective view of the dual vortex baffle box of FIG. 1.
Figure 10:
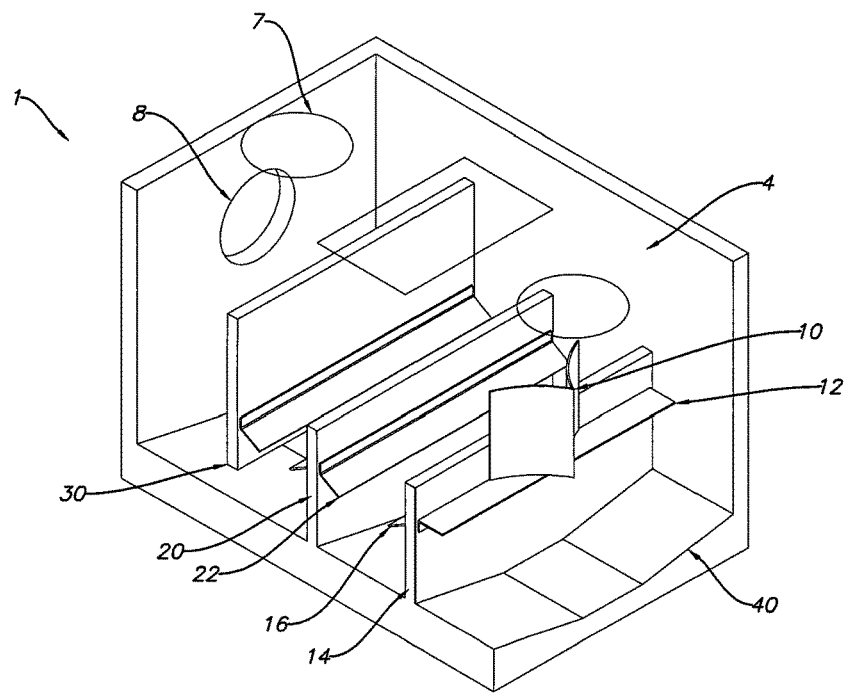
FIG. 10 is an upper front left perspective view of the dual vortex baffle box of FIG. 1.

FIG. 1 is a top view of a dual vortex baffle box 1 with 40 sloped floors, flow spreader 10, shelf 12, baffles 14, 20, 30 and baffle deflectors 16, 22, 24, 32 and arrows showing water flow. FIG. 2 is an inflow end view of the dual vortex baffle box 1 of FIG. 1 along arrow 2X. FIG. 3 is a side cross-sectional view of the dual vortex baffle box 1 of FIG. 1 arrows 3X. FIG. 4 is another top view of the dual vortex baffle box 1 of FIG. 1 without arrows. FIG. 5 is another inflow end view of the dual vortex baffle box 1 of FIG. 2. FIG. 6 is another side cross-sectional view of the dual vortex baffle box 1 of FIG. 3. FIG. 7 is an upper front right perspective view of the dual vortex baffle box 1 of FIG. 1. FIG. 8 is an upper rear left perspective view of the dual vortex baffle box 1 of FIG. 1. FIG. 9 is an upper rear right perspective view of the dual vortex baffle box 1 of FIG. 1. FIG. 10 is an upper front left perspective view of the dual vortex baffle box 1 of FIG. 1.

Referring to FIGS. 1-10, storm water can enter into inflow line into baffle box 1 via an inflow pipe 2. The baffle box 1 can be a vault having closed sides 4, sloped floor 40 with left and right sides sloping down to a middle portion running from the inlet end to the outlet pipe 8. The baffle box 1 can have a top 6, with access points 7 that allow for servicing into the vault.

A flow spreader 10 can have a generally V shape (when viewed from the top) with concave curved walls can be mounted to the side of a first baffle 14 on a horizontal deflector shelf 12. The top half of the flow spreader can extend above the height of the first baffle, so that water can flow both over the first baffle 16 and also downward on the shelf 12 and toward the sloped floor 40. The flow spreader 10 can influence the spreading of storm water entering into the box 1 to flow wide while creating a vortex to the left and right of the inflowing water from inlet pipe 2. The vortex created to the left and right of the flow spreader 10 can influence solids to settle into the lower settling chambers formed in front of the first baffle 14, as well as the chambers between the first baffle 14 and the second baffle 20 and between the second baffle 20 and rear wall below the outflow pipe 8.

A deflector formed from a horizontal shelf 12 located along the underside of the flow spreader 10 can aid with preventing the turbulent water entering the treatment system from scouring previously captured sediments. Essentially, a calm zone is created below the horizontal deflector 12. This zone can enable fine particles to settle while preventing previously captured fine particles from being re-suspended out of this settling zone.

On the outlet side of the first baffle 14 can be a downwardly angled first baffle deflector 16. A second baffle 20 having a similar height to the first baffle 14 can be spaced away from the first baffle 14. The second baffle 20 can have a downwardly angled first deflector on an inlet side and a downwardly angled second deflector on an outlet side.

The flow spreader 10 and deflectors can be similar to those shown and described in U.S. Pat. No. 8,142,666 to Happel, which is incorporated by reference in its' entirety.

Both the bottom ends of the first baffle 14 and the second baffle 20 can be directly mounted to the sloped floor 40 forming closed chambers between the inlet wall and the first baffle 14, and between the first baffle 14 and the second baffle 20. Debris can settle on the sloped floor 40 and slide toward the middle of the sloped floor 40, which can be later removed by vacuums and the like, that can be used within access points 7.

A skimmer baffle 30 can be located between the second baffle 20 and the outlet wall having the outflow pipe 8. The skimmer baffle 30 can be mounted to the side walls 4 of the box 1 so that the bottom of the skimmer baffle is raised above the sloped floor 40. The top of the skimmer baffle 30 is higher than the first baffle 14 and second baffle 20 and can be higher than the flow spreader 10

The baffles 14 and 20 with deflectors 12, 16, 22, 24 can help to isolate solids that settle in the lower settling chambers from turbulent water flow, which can cause the solids to move toward the middle of the sloped floor 40.

In addition, the use of a skimmer baffle 30 and deflector 32 can help to prevent the conveyance of floatables. Water flow can pass both above and below the skimmer baffle 30

The skimmer 30 located between the baffles 14, 20 and the outflow pipe 8 can act to prevent floatables from being conveyed downstream of the system.

Second Embodiment Dual Baffle Box/Vault System with Screen Systems and Hinging Lids FIG. 11 is a top view of the dual screen baffle box 50 with first (left side) screen box 60 and second (right side) screen box 70 and arrows showing water flow. FIG. 12 is an inflow end view of the dual screen baffle box 50 of FIG. 11 along arrow 12X. FIG. 13 is a side cross sectional view of the dual screen baffle box 50 of FIG. 11 along arrows 13X. FIG. 14 is another top view of the dual screen baffle box 50 of FIG. 11 without arrows. FIG. 15 is another inflow end view of the dual screen baffle box 50 of FIG. 12. FIG. 16 is another side cross-sectional view of the dual screen baffle box 50 of FIG. 13. FIG. 17 is an upper front right perspective view of the baffle box 50 of FIG. 11. FIG. 18 is an upper rear left perspective view of the baffle box 50 of FIG. 11. FIG. 19 is an upper rear right perspective view of the baffle box 50 of FIG. 11. FIG. 20 is an upper front left perspective view of the baffle box 50 of FIG. 11.

Referring to FIGS. 11-20, this embodiment is similar to the previous embodiment with the addition of the dual screen boxes 60, 70 each with hinging lids 65, 75. A first (left side) screen box 60 can include screen front wall 62, screen sides 64, hinged screen lid 65 screen rear wall 66, and screen floor 68. A second (right side) screen box 70 can include screen front wall 72, screen sides 74, hinged screen lid 75 screen rear wall 76, and screen floor 78.

After the storm water flow has been spread wide by the flow spreader 10, the flow will enter into the body of a screen system (dual screen systems) 60, 70 located on each side of the vault/box 50. The dual screen systems 60, 70 can each capture floating debris such as litter and foliage. As water flow and floating debris enters into the dual screen systems 60, 70, water will pass through the screens in each of the screen boxes 60, 70 and the floating debris will be retained within the screens 62, 64, 65, 66, 68, 72, 84, 75, 76, and 78. The dual screen boxes 60, 70 can be positioned within the vault/box so that the bottoms (floors) 68, 78 of the screen systems 60, 70 are above the invert elevation of the outflow pipe 8.

Screen systems 60, 70 can be formed similar to screen systems shown and described in U.S. Pat. No. 8,491,797 to Happel, which is incorporated by reference in its' entirety. The openings in the screens can range from approximately ⅛ of an inch to approximately 2 inches in diameter, and be either uniform diameters or combinations of different diameters as needed.

After a rain event has ended and the hydraulic gradeline within the vault/box will lower to an elevation equal to that of the outflow pipe 8 invert. Because the captured debris in the screen systems 60, 70 is higher in elevation than that of the water level retained in the vault/box, the captured debris will be stored in a dry state between rain events. Storing the captured debris in a dry state between rain events prevents the pollutants contained in the floating debris from diffusing into the water over time.

Third Embodiment Dual Baffle Box/Vault/System with Screened Systems and Screened Media Vessel FIG. 21 is a top view of the dual screen baffle box 80 with screened media vessel 90 and arrows showing water flow. FIG. 22 is an inflow end view of the dual screen baffle box 80 of FIG. 21 along arrow 22X. FIG. 23 is a side cross sectional view of the dual screen baffle box 80 of FIG. 21 along arrows 23X. FIG. 24 is another top view of the dual screen baffle box 80 of FIG. 21 without arrows. FIG. 25 is another inflow end view of the dual screen baffle box 80 of FIG. 22. FIG. 26 is another side cross-sectional view of the dual screen baffle box 80 of FIG. 23. FIG. 27 is an upper front right perspective view of the baffle box 80 of FIG. 21. FIG. 28 is an upper rear left perspective view of the baffle box 80 of FIG. 21. FIG. 29 is an upper rear right perspective view of the baffle box 80 of FIG. 21. FIG. 30 is an upper front left perspective view of the baffle box 80 of FIG. 21.

Referring to FIGS. 21-30, this embodiment is similar to the previous embodiment with the addition of the screened media vessel 90. Media vessel 90 can be a box shape having screened sides and screen bottom. The media vessel 90 can have screens with openings that can range from approximately ⅛ of an inch to approximately 2 inches in diameter, and be either uniform diameters or combinations of different diameters as needed.

Filtration media 95 can be placed into the media vessel 90 between the skimmer baffle 30 and the outflow pipe 8. Types of filtration media 95 that can be used include but are not limited to those described in U.S. Pat. Nos. 7,824,551; 7,955,507; 8,002,984; 8,002,985; and U.S. Pat. No. 8,153,005 to Wanielista et al., which are incorporated by reference.

The filtration media 95 can be contained within vessel 90 so that the water flow cannot dislodge the media and wash it down stream. Water flow can be diverted downward by the skimmer baffle 30, and then the water flow will upflow through the media 95 in the media vessel 90. As the water passes through the media sorbent surfaces, physical filtration, and biological activity will act to capture pollutants.

In the event that a large rain event occurs and the water level within the treatment system rises in elevation above the screen systems 60, 70 and skimmer baffle 30, water flow can be conveyed above all the specialized components of the treatment system 80. The cross-sectional conveyance through the vault/box 80, and above the screen systems 60, 70 and skimmer baffle 30, far exceeds that of the inflow pipe 2 and outflow pipe 8. Because the potential water conveyance above all the specialized components of the treatment system 80 is so great, the potential upstream flooding is avoided.

Fourth Embodiment Dual Baffle Box/Vault/System with Hydroslide Servicing System

FIG. 31 is a top view of the dual screen baffle box/vault/system 100 with hydroslide servicing system and arrows showing water flow. FIG. 32 is an inflow end view of the dual screen baffle box 100 of FIG. 31 along arrow 32X. FIG. 33 is a side cross sectional view of the dual screen baffle box 100 of FIG. 31 along arrows 33X. FIG. 34 is another top view of the dual screen baffle box 100 of FIG. 31 without arrows. FIG. 35 is another inflow end view of the dual screen baffle box 100 of FIG. 22. FIG. 36 is another side cross-sectional view of the dual screen baffle box 100 of FIG. 33. FIG. 37 is an upper front right perspective view of the baffle box 100 of FIG. 31. FIG. 38 is an upper rear left perspective view of the baffle box 100 of FIG. 31. FIG. 39 is an upper rear right perspective view of the baffle box 100 of FIG. 31. FIG. 40 is an upper front left perspective view of the baffle box 100 of FIG. 11.

FIG. 41 is an upper front right perspective view of the baffle box 100 of FIG. 37 with screened medial vessel 90, flow spreader 10 and screens 60, 70 with hinge lids all removed. FIG. 42 is an upper rear left perspective view of the baffle box 100 of FIG. 38 with screened media vessel 90, flow spreader 10 and screens 60, 70 with hinge lids all removed. FIG. 43 is an upper rear right perspective view of the baffle box 100 of FIG. 39 with screened media vessel 90, flow spreader 10 and screens 60, 70 with hinge lids all removed. FIG. 44 is an upper front left perspective view of the baffle box 100 of FIG. 40 with screened media vessel 90, flow spreader 10 and screens 60, 70 with hinge lids all removed.

Referring to FIGS. 31-44, this embodiment 100 includes the features of the previous embodiments 1, 50, 80 with a screened media vessel 90. The filtration media 95 can be contained within a screen system so that the water flow cannot dislodge the media 95 and wash it down stream. Water flow can be diverted downward by the skimmer 40, and then the water flow will upflow through the media 95. As the water passes through the media sorbent surfaces, physical filtration, and biological activity will act to capture pollutants.

In the event that a large rain event occurs and the water level within the treatment system rises in elevation above the screen systems and skimmer, water flow can be conveyed above all the specialized components of the treatment system. The cross-sectional conveyance through the vault, and above the screen systems and skimmer, far exceeds that of the inflow and outflow pipes. Because the potential water conveyance above all the specialized components of the treatment system is so great, the potential upstream flooding is avoided.

Referring to FIGS. 31-44, the hydroslide system used can include 105 water connection(s) 105 that are generally accessible through access points 7 in the top of the box/vault that connect to exterior water sources. The water connections 105 are attached to upper horizontal water line(s) 180 which can feed into vertical water line(s) 110 and down to spray bar(s) 120 that can be located along side floor corners of the sloped floor 40. Each of the spray bar(s) can include spray head(s) 125 which direct water sprays generally perpendicular to the spray bars 120 and onto the sloped floor 40. These types of hydroslide systems shown in FIGS. 31-44 can operate similar to those described in U.S. patent application Ser. No. 14/288,455 filed May 28, 2014, which claims the benefit of priority to U.S. Provisional Application Ser. No. 61/828,958 filed May 30, 2013. The entire disclosure of each of these listed applications are incorporated herein by specific reference thereto.

Referring to FIGS. 31-44, the high pressure water servicing system can dramatically reduce the required time to remove the captured debris in the lower chambers. The servicing system has high water pressure jets that will flush captured debris toward the center of the settling chambers. These jets will liquefy the captured debris from underneath, turn the captured debris into a slurry, and then flush the debris slurry toward the center of the settling chambers so that a vacuum truck can easily remove the slurry.

The use of this high pressure servicing system avoids the need for a service technician to enter the vault to perform servicing. The regulations set by OSHA for personnel to enter a confined space, such as a storm water treatment system for servicing, are complicated, time consuming, and costly.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A single treatment system in a stormwater vault, comprising:
 a flow spreader forming a hydro-dynamic separation of incoming storm water passing through an inlet of the stormwater vault into two flow paths, the stormwater vault having at least a first lower settling chamber beneath the flow spreader, and a second lower settling chamber, the flow spreader creating a vortex to the left and right of the inflowing water, wherein the vortex assists to influence solids to settle into the first and the second lower settling chambers in the stormwater vault; and
 dual screen filtration systems in the stormwater vault, the dual screen filtration systems being above the second lower settling chamber, each of the dual screen filtration systems located on each side of the treatment system for receiving the two flow paths, each of the dual screen filtration systems spaced apart from one another, wherein the hydro-dynamic separation and the screen filtration are all in a single treatment system in the stormwater vault.

2. The single treatment system of claim 1, further comprising:
 at least one baffle in the single treatment system behind the flow spreader; and
 a shelf in front of the at least one baffle for supporting the flow spreader thereon.

3. The single treatment system of claim 2, further comprising:
 at least one downward angled deflector on a rear side of the at least one baffle, the deflector located along an underside of the flow spreader to aid with preventing turbulent water entering the treatment system from scouring previously captured sediments.

4. The single treatment system of claim 2, wherein the at least one baffle includes two baffles, each of the baffles having at least one downwardly angled defector, and the single treatment system includes a skimmer located between the dual screen filtration systems and an outflow pipe will act to prevent floatables from being conveyed downstream.

5. The single treatment system of claim 1, further comprising:

a skimmer baffle to assist in preventing conveyance of floatables.

6. The single treatment system of claim 5, further comprising:
a downwardly angled deflector on an inflow side of the skimmer baffle.

7. The single treatment system of claim 1, further comprising:
media filtration in the stormwater vault for receiving flow after the dual screen filtration systems, the media filtration being located between the dual screen filtration systems and an outlet to the stormwater vault.

8. The single treatment system of claim 1, wherein each of the dual screen filtration systems include:
a hinged lid, which is used to access and remove debris captured inside of each of the dual screen filtration systems, and space formed between the dual screen filtration systems allows for directly servicing a floor the single treatment system without having to access through the dual screen filtration systems.

9. The single treatment system of claim 8, wherein the dual screen filtration systems are positioned within the treatment system so that bottoms of the screen systems are above an invert elevation of the outflow pipe.

10. The single treatment system of claim 1, further comprising:
a pressure water servicing system adjacent a bottom of the treatment system, the pressure water servicing system being used to flush captured debris toward the center of settling chambers.

11. A single treatment system for storm water, comprising:
a vault having an inlet side with an inflow line above a floor, and an outlet side with an outflow flow line above the floor, the vault having closed side walls between the inlet side and the outlet side;
a flow spreader above the floor in the vault facing the inlet side, which splits incoming water from the inflow line into dual paths; and
dual screen filter boxes along both of the sidewalls inside of and above the floor of the vault, the dual filter boxes being parallel to and spaced apart from one another, so that parts of floatables are captured by the dual screen filter boxes and prevented from being conveyed to a receiving downstream water body outside of the vault, wherein parts of the floatables captured by the dual screen filter boxes are stored at an elevation above a static water level.

12. The single treatment system of claim 11, further comprising:
at least one baffle in the vault; and
a shelf underneath the flow spreader, the shelf having sides that extend up to the closed side walls of the vault.

13. The single treatment system of claim 12, wherein the at least one baffle includes:
a first baffle adjacent to the flow spreader; and
a skimmer baffle parallel and spaced between the first baffle and the outlet side of the vault, the skimmer baffle having a bottom end raised above the floor and a top end spaced higher than top ends of both the first baffle and a second baffle spaced between said first baffle and said skimmer baffle, wherein the dual paths of incoming water are assisted by the first baffle and the skimmer baffle in isolating solids to settle into lower settling chambers on the floor from turbulent water flow, and the skimmer baffle assists in preventing conveyance of floatables from the incoming water from exiting out the outflow line.

14. The single treatment system of claim 13, further comprising:
a first downwardly angled deflector on an outlet side of the first baffle; and
a second downwardly angled baffle deflector on an inlet side of the skimmer baffle.

15. The single treatment system of claim 14, further comprising:
a media vessel holding filtering media therein, the media vessel being positioned between the skimmer baffle and the outlet side of the vault and below the outlet flow line, wherein water flow is diverted downward by the skimmer baffle and upward through the media vessel.

16. The single treatment system of claim 15, wherein further comprising:
water pressure lines with spray heads located along edges corner edges of the floor being a sloped floor so that debris is washed down the sloped floor to central locations that are easily removable from vacuums for preventing technicians from entering into vault.

17. The single treatment system of claim 16, wherein each of the dual screen filter boxes include:
screened lids that are hinged to top openings of each of the dual screen boxes, which allow access to remove the parts of the floatables captured inside of the dual screen boxes.

18. The single treatment system of claim 13, further comprising:
a media vessel holding filtering media therein, the medial vessel being positioned between the skimmer baffle and the outlet side of the vault and below the outlet flow line, wherein water flow is diverted downward by the skimmer baffle then flow upward through the media in the media vessel so that physical filtration and biological activity will capture pollutants from the water flow.

19. The single treatment system of claim 18, further comprising:
water pressure lines with spray heads located along edges corner edges of the floor that can be a sloped floor so that debris is washed down the sloped floor to central locations that are easily removable from vacuums for preventing technicians from entering into vault.

20. The single treatment system of claim 11, wherein each of the dual screen filter boxes include:
screened lids that are hinged to top openings of each of the dual screen boxes, which allow access to remove the parts of the floatables captured inside of the dual screen boxes.

* * * * *